July 25, 1933.  E. L. WHITE  1,920,045
SIGNAL LIGHT SWITCH
Filed May 27, 1929
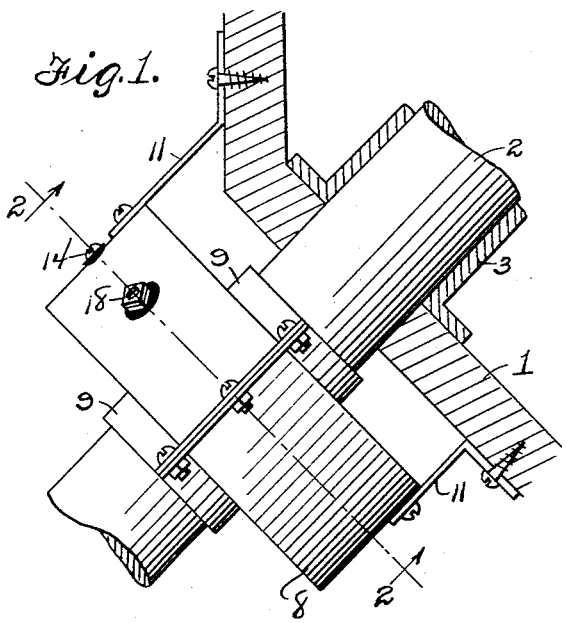
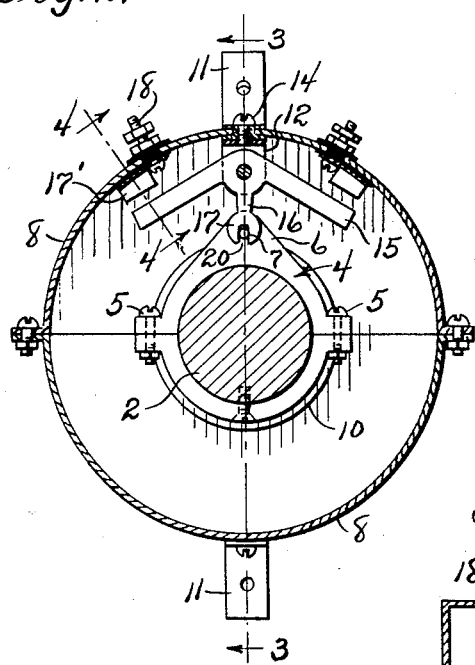
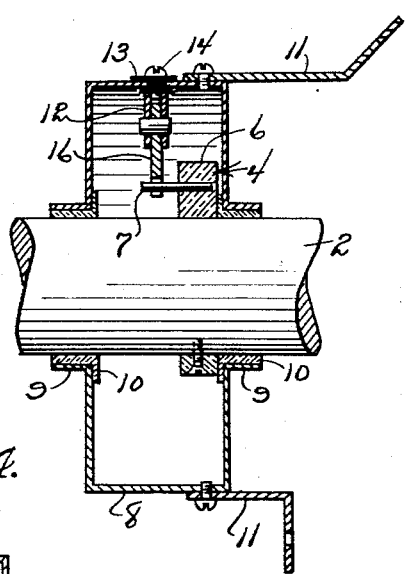
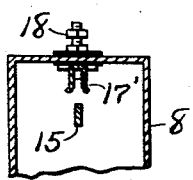
Elmer L. White
INVENTOR
BY Victor J. Evans
ATTORNEY Patented July 25, 1933

1,920,045

UNITED STATES PATENT OFFICE

ELMER L. WHITE, OF DETROIT, MICHIGAN

SIGNAL LIGHT SWITCH

Application filed May 27, 1929. Serial No. 366,496.

My present invention has reference to a signalling device for automobiles, my object being the provision of a mechanism, operated by the turning of the steering post of an automobile for flashing lights arranged at the rear of the machine to indicate to vehicles and pedestrians the direction of the course the driver is to pursue, that is whether he is about to make a turn either to the right or to the left and further wherein the signal will be illuminated as long as the post is turned to guide the steering wheels in the proper direction, after which the signal will be automatically extinguished.

A further object is the provision of a switch for controlling signal lamps which shall be of an extremely simple construction and which may be easily and quickly arranged between the steering post and the front or dash of the automobile and further one which will be positive in action.

To the attainment of the foregoing the invention further consists in the novel construction, combination and operative association of parts, one satisfactory embodiment of which is disclosed by the accompanying drawing.

In the drawing:

Figure 1 is a side elevation of the improvement, the front or dash of the automobile being in section as well as is the steering post column.

Figure 2 is a sectional view on the line 2—2 of Figure 1.

Figure 3 is a sectional view approximately on the line 3—3 of Figure 2.

Figure 4 is a detail sectional view approximately on the line 4—4 of Figure 2.

While it will be apparent that I can arrange my improved switch in other positions than that disclosed by the drawing I have by way of illustration shown the same arranged below the front or dash 1 of an automobile. The signal is not shown, as the same does not form a part of this invention. It is, however, sufficient to state that the signal is attached to the rear of the automobile and contains two housings for lamp bulbs, the facing of the housings being translucent and having inscribed thereon the transparent words "Right" and "Left," respectively.

Again referring to the drawing the numeral 2 designates the steering post and 3 the column therefor. The steering post, of course, projects a suitable distance below the front or dash 1 and below the steering post column and to this projecting portion I attach a preferably two-part fibre ring 4 whose confronting ends are formed with outstanding lugs which are separately connected by screws 5. One of the sections of the fibre ring 4 is formed with a nose extension 6 from which extends a pin 7.

There is arranged around the steering post to enclose the ring 4 a preferably cylindrical and two-part casing 8. This casing has its axial center provided with openings that are surrounded by outstanding flanges 9 and in each of these flanges there is arranged a fibre or other non-electric conducting flanged bushing 10 that is in direct contact with the steering post 2. The casing is provided on its outer face with angle brackets 11 which are attached to the outer or front face of the dash 1, and whereby the casing is effectively but removably secured to the dash.

The casing has centrally fixed therein but insulated therefrom a bifurcated bracket 12. The attaching element for this bracket, which passes through an insulator 13, is in the nature of a screw 14 and this screw is wired in circuit with the timer for the engine of the automobile. Pivotally secured between the arms of the bracket 12 there is the central portion of a V-shaped knife or wiper switch member 15. From its center the switch member 15 is provided with a short arm 16 that merges into a round head 17 and this head at its lower side is provided with a centrally arranged slot 20 the side walls of which are flared outwardly and which slot receives therein the pin 7.

Secured to but insulated from the casing 8 and disposed in a line with the respective arms of the V-shaped switch 15 are U-shaped spring contacts 17'. These contacts are connected to the casing by binding posts 18 and these binding posts are designed to have attached thereto wires which lead to the respective bulbs in the signal casing.

The arms of the contacts 17' are designed to exert a frictional engagement with the arms of the switch 15. When the steering post column is turned it will through the medium of the pin 15 swing the switch member 15 to bring either of the arms thereof between the spring contacts 17'. If the steering post is turned a sufficient distance the pin will ride out of the slot 20 but the contact 17' engaging one of the arms will exert a frictional engagement thereagainst sufficient to hold the same in engagement with the said contact so that the bulb which is illuminated in the lamp house by the engagement of the switch with the contact will remain lighted until the steering post is returned to its initial position. The turning of the steering post will bring the pin into the slot 20 and as long as the steering post is held in a position to direct the automobile in a straight direction the switch 15 will not be thrown and consequently neither of the lamps in the signal house will be illuminated.

The construction and advantages of the improvement will be fully apparent to those skilled in the art to which this invention relates after the foregoing description has been carefully read in connection with the accompanying drawing. Obviously I do not wish to be restricted to the precise details herein set forth and, therefore, hold myself entitled to make such changes therefrom as fairly fall within the scope of what I claim.

Having described the invention, I claim:

A switch comprising a casing including two-semicylindrical detachably connected sections having aligned central openings, a shaft journaled in said openings, brackets supporting the casing with relation to the shaft, a ring of insulating material fixed on the shaft for movement therewith and located within the casing, a nose extension projecting from said ring, a pin supported by said extension and projecting therefrom in parallelism with the shaft, spaced fixed contacts arranged within and supported by one section of the casing at opposite sides of the said nose extension, a bifurcated bracket supported by said section of the casing and insulated therefrom and located between the fixed contacts, a V-shaped movable contact pivoted in said bifurcated bracket above said pin, and a short bifurcated arm depending from the apex of the V-shaped contact and straddling said pin to operate the switch when the shaft is rotated in either direction.

ELMER L. WHITE.